US 9,958,056 B2

(12) United States Patent
Torii et al.

(10) Patent No.: US 9,958,056 B2
(45) Date of Patent: May 1, 2018

(54) POWER TRANSMISSION APPARATUS

(71) Applicant: AISIN AW CO., LTD., Anjo-shi, Aichi-ken (JP)

(72) Inventors: Takeshi Torii, Chiryu (JP); Kentaro Kakuda, Anjo (JP); Kazuya Kawamura, Anjo (JP); Hiroaki Sanji, Takahama (JP); Akihito Hattori, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 378 days.

(21) Appl. No.: 14/764,925

(22) PCT Filed: Mar. 20, 2014

(86) PCT No.: PCT/JP2014/057810
§ 371 (c)(1),
(2) Date: Jul. 30, 2015

(87) PCT Pub. No.: WO2014/156975
PCT Pub. Date: Oct. 2, 2014

(65) Prior Publication Data
US 2015/0362063 A1 Dec. 17, 2015

(30) Foreign Application Priority Data
Mar. 29, 2013 (JP) ................................. 2013-073678

(51) Int. Cl.
*F16H 57/10* (2006.01)
*F16H 3/66* (2006.01)
*F16H 57/021* (2012.01)

(52) U.S. Cl.
CPC ........... *F16H 57/10* (2013.01); *F16H 57/021* (2013.01); *F16H 3/663* (2013.01);
(Continued)

(58) Field of Classification Search
CPC .......................... F16H 57/10; F16H 2200/006
See application file for complete search history.

(56) References Cited

U.S. PATENT DOCUMENTS 3,929,037 A   12/1975  Marsch
4,944,193 A * 7/1990  Harada .................. B60K 17/28
                                                      475/331
(Continued)

FOREIGN PATENT DOCUMENTS

DE    10 2014 101133 A1   8/2014
JP         S55-12604 Y2   3/1980
(Continued)

OTHER PUBLICATIONS

Jun. 24, 2014 Search Report issued in International Patent Application No. PCT/JP2014/057810.
(Continued)

*Primary Examiner* — Terence Boes
(74) *Attorney, Agent, or Firm* — Oliff PLC

(57) ABSTRACT

A power transmission apparatus including a transmission, a case that accommodates the transmission, a counter drive gear to which power from the transmission is transmitted, and a counter driven gear that meshes with the counter drive gear, the power transmission apparatus including: a brake that fixes any rotational element of the transmission to the case so as not to be rotatable; and supporting member that is fixed to the case via a fastening member and that supports the counter drive gear so as to be rotatable, wherein the supporting member is integrally molded with a cylindrical drum portion that functions as a brake drum of the brake.

8 Claims, 8 Drawing Sheets

(52) U.S. Cl.
CPC ............... *F16H 2200/006* (2013.01); *F16H 2200/2007* (2013.01); *F16H 2200/2023* (2013.01); *F16H 2200/2046* (2013.01); *F16H 2200/2066* (2013.01); *F16H 2200/2079* (2013.01); *F16H 2200/2082* (2013.01); *F16H 2200/2097* (2013.01); *Y10T 74/19637* (2015.01)

(56) References Cited

U.S. PATENT DOCUMENTS

| | | |
|---|---|---|
| 6,415,685 B1 | 7/2002 | Taniguchi et al. |
| 2008/0039285 A1* | 2/2008 | Park .................... F16H 3/66 477/116 |
| 2008/0202884 A1* | 8/2008 | Nishida ............ F16D 25/0638 192/106 F |

FOREIGN PATENT DOCUMENTS

| | | |
|---|---|---|
| JP | H07-23645 Y2 | 5/1995 |
| JP | 2000-161450 A | 6/2000 |
| JP | 2002-349683 A | 12/2002 |
| JP | 2007-051651 A | 3/2007 |
| JP | 2010-077985 A | 4/2010 |
| JP | 2013-145016 A | 7/2013 |
| WO | 2009/004831 A1 | 1/2009 |

OTHER PUBLICATIONS

Aoki, T. et al., "The World's First Transverse 8-Speed Automatic Transmission," Society of Automotive Engineers, Apr. 16, 2013, vol. 1.

Jul. 18, 2017 Search Report issued in European Patent Application No. 14774694.5.

* cited by examiner

FIG. 2

|   |      | C-1 | C-2 | C-3 | C-4 | B-1 | B-2 | F-1 |
|---|------|-----|-----|-----|-----|-----|-----|-----|
| D | 1st  | ○   |     |     |     |     | ●   | ○   |
|   | 2nd  | ○   |     |     |     | ○   |     |     |
|   | 3rd  | ○   |     | ○   |     |     |     |     |
|   | 4th  | ○   |     |     | ○   |     |     |     |
|   | 5th  | ○   | ○   |     |     |     |     |     |
|   | 6th  |     | ○   |     | ○   |     |     |     |
|   | 7th  |     | ○   | ○   |     |     |     |     |
|   | 8th  |     | ○   |     |     | ○   |     |     |
| REV1 |    |     |     | ○   |     |     | ○   |     |
| REV2 |    |     |     |     | ○   |     | ○   |     |

※○: ENGAGED
●: ENGAGED WHEN ENGINE BRAKING IS IN OPERATION.

POWER TRANSMISSION APPARATUS

BACKGROUND

The present disclosure relates to a power transmission apparatus including a transmission, a case that accommodates the transmission, and a counter drive gear to which power from the transmission is transmitted.

Conventionally for this type of power transmission apparatus, a power transmission apparatus is known that includes a speed change mechanism having a multi-plate friction type brake capable of fixing a sun gear of a speed reducing planetary gear to a transmission case so that the sun gear is not rotatable, a counter drive gear to which power from the speed change mechanism is transmitted, a counter driven gear that meshes with the counter drive gear, a drive pinion gear integrated with a countershaft and fitted through a spline to the counter driven gear, and a center support that is fastened to the transmission case with a bolt and that supports the counter drive gear so that the counter drive gear is rotatable (see e.g., JP 2002-349683 A). A brake drum constituting the brake of the power transmission apparatus includes a radial flange portion extending from one end in a radially inward direction. An inner circumferential portion of the radial flange portion has inner circumferential teeth. By fitting the inner circumferential teeth to protrusions formed on a wall surface of an outer circumferential portion of the center support, the brake drum is fixed to the center support so as not to be rotatable. The center support includes a boss portion that rotatably supports the counter drive gear via a bearing, and a wall portion that is extended radially outward from the boss portion and that is fastened to the transmission case with a bolt. A cutout portion is formed in the wall portion of the center support to avoid interference with the counter driven gear.

SUMMARY

However, it is not easy to enhance the strength of the center support having the cutout portion formed on the wall portion in the conventional power transmission apparatus. Thus, when the power is transmitted between the counter drive gear and the counter driven gear, the load from the counter driven gear acts on the center support, and thus the wall portion may be deformed. This may accompany increasing gear noise caused between the counter drive gear and the counter driven.

The present disclosure according to an exemplary aspect enhances the strength of a supporting member that supports the counter drive gear of a power transmission apparatus.

The power transmission apparatus according to the present disclosure adopts the following according to an exemplary aspect.

A power transmission apparatus according to an exemplary aspect of the present disclosure relates to a power transmission apparatus including a transmission, a case that accommodates the transmission, a counter drive gear to which power from the transmission is transmitted, and a counter driven gear that meshes with the counter drive gear. The power transmission apparatus includes: a brake that fixes any rotational element of the transmission to the case so as not to be rotatable; and a supporting member that is fixed to the case via a fastening member and that supports the counter drive gear so as to be rotatable; in which the supporting member is integrally molded with a cylindrical drum portion that functions as a brake drum of the brake.

In the power transmission apparatus, the cylindrical drum portion that functions as the brake drum of the brake that fixes any of rotational elements of the transmission to the case so as not to be rotatable is integrally molded with the supporting member that is fixed to the case via the fastening member and that supports the counter drive gear so as to be rotatable. Since the cylindrical drum portion is thus integrally molded with the supporting member that supports the counter drive gear, the drum portion also functions as a rib. Thus, it is possible to enhance the strength of the supporting member. As a result, when the power is transmitted between the counter drive gear and the counter driven gear, deformation of the supporting member can be suppressed even if the load from the counter driven gear side acts on the supporting member. This allows appropriately meshing the counter drive gear with the counter driven gear and reducing the gear noise. Furthermore, since the drum portion is integrally molded with the supporting member, the number of components can be reduced and the ease of assembly of the transmission, and eventually, the power transmission apparatus can be enhanced.

The brake may include a brake hub disposed inside of the drum portion and coupled to the rotational element, a first friction engagement plate fitted to the brake hub, a second friction engagement plate fitted to the drum portion of the supporting member, and a piston that is disposed inside of the drum portion and that presses and engages the first and second friction engagement plates by friction. The supporting member may include a boss portion that supports the counter drive gear so as to be rotatable, and an annular wall portion that is integrally molded with the boss portion and the drum portion so as to extend between the boss portion and the drum portion. In the power transmission apparatus configured as above, the oil chamber of the brake is defined inside of the drum portion. Thus, the annular wall portion is formed to a disc shape without a cutout (opening), so that it is possible to suppress lowering in the strength of the supporting member. Furthermore, since the oil chamber of the brake is defined inside of the drum portion that is integrally molded with the supporting member, the brake, and eventually, the transmission can be reduced in size.

The drum portion may include a fastening portion extended outward from an outer circumferential surface in one end and fastened to the case via a bolt. A recess extending from the fastening portion to the other end of the drum portion may be formed in the outer circumferential surface of the drum portion. A spline, to which the second friction engagement plate is fitted, may be formed on an inner circumferential surface of the drum portion. The spline may include an absent portion formed to be located on a back side of the recess. Accordingly, the recess formed in the outer circumferential surface of the drum portion can be used as a clearance portion of the tool, and the like, when the supporting member is fastened to the case, so that projection of the fastening portion from the outer circumferential surface of the drum portion can be suppressed and the supporting member, and eventually, the transmission can be further reduced in size. Since the spline on the inner circumferential surface of the drum portion has the absent portion, the strength of the drum portion, and eventually, the supporting member can be satisfactorily maintained even if the recess is formed in the outer circumferential surface.

Furthermore, the brake may further include a return spring that is disposed inside of the drum portion and that biases the piston, and a spring supporting member that is disposed inside of the drum portion and that supports the return spring. The spring supporting member may include an annular supporting portion that supports one end of the return spring, and a plurality of extended portions extending from the annular supporting portion at intervals in a circumferential direction and each including a play end that is extended inward. A plurality of contacting portions each contacting with the play end of the spring supporting member may be formed on an inner surface of the annular wall portion. The spring supporting member may be prevented from falling out from the annular wall portion by a snap ring attached to the annular wall portion such that the snap ring supports the play end contacting with the corresponding contacting portion. Accordingly, the spring supporting member can be disposed in a little space in the drum portion, so that the space required to support the return spring can be reduced, and the transmission, and eventually, the power transmission apparatus can be further reduced in size.

The counter driven gear may include a tooth portion that is formed to axially face the supporting member and that meshes with another member. The annular wall portion may have a recessed portion formed to surround the tooth portion, and define an oil chamber, to which hydraulic oil is supplied, inside of the recessed portion in cooperation with the drum portion and the piston. Thus, the lowering in the strength of the supporting member is a concern when the recessed portion is formed in the annular wall portion to suppress the interference with the tooth portion provided on the counter driven gear. However, a cutout (opening) is not formed at the periphery of the recessed portion of the annular wall portion as the oil chamber of the brake is defined inside of the drum portion and the annular wall portion. Thus, it is possible to satisfactorily suppress the lowering in the strength of the supporting member which is associated with forming the recessed portion that suppresses the interference with the tooth portion provided on the counter driven gear.

Moreover, an inner surface of the annular wall portion that faces the piston and defines the oil chamber may be formed so that a portion located inside of the recessed portion projects further toward the piston than other portions. The annular wall portion may have a hydraulic oil supply/discharge hole communicating with the oil chamber such that the hole is spaced apart from the recessed portion in a circumferential direction. Accordingly, the portion located inside of the recessed portion of the oil chamber is made shorter (shallower) in the axial direction of the piston to have a smaller capacity than the other portions. This allows enhancing the strength of the annular wall portion, and eventually, the supporting member, and allows the hydraulic oil to be easily returned from the portion located inside of the recessed portion toward the hydraulic oil supply/discharge hole spaced apart from the recessed portion, and thereby the discharging property of the hydraulic oil can be enhanced.

The supporting member may include a boss portion that supports the counter drive gear so as to be rotatable, and an annular wall portion that is integrally molded with the boss portion and the drum portion so as to extend between the boss portion and the drum portion. The drum portion may be extended toward an opposite side from the boss portion in the axial direction.

Furthermore, the drum portion may be extended toward an opposite side opposite from the brake in the axial direction so as to surround at least a part of the boss portion, and may include a fastening portion that is extended outward from an outer circumferential surface adjacent to the boss portion and is fastened to the case via a bolt.

BRIEF DESCRIPTION OF THE DRAWINGS

FIG. 2 is an operation table showing a relationship between shift speeds of an automatic transmission included in a power transmission apparatus of FIG. 1 and operation states of clutches and brakes.

DETAILED DESCRIPTION OF THE EMBODIMENTS

A mode for carrying out the disclosure will now be described with reference to the drawings.

Figure 1:
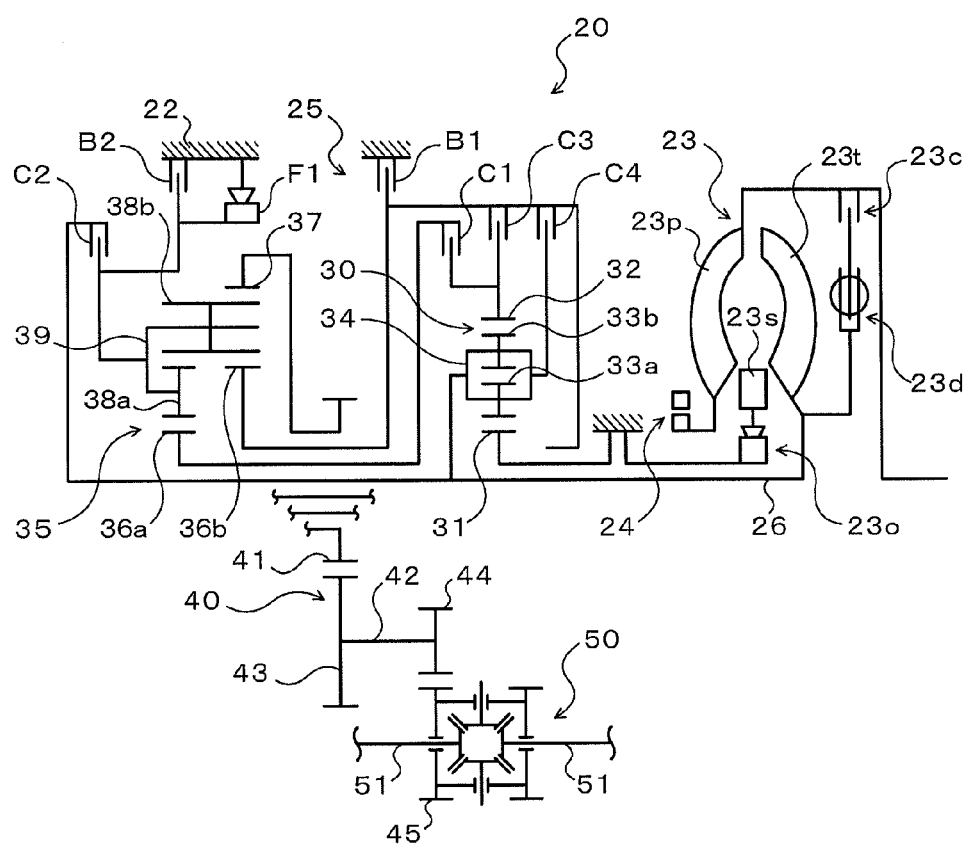
FIG. 1 a schematic configuration view of a power transmission apparatus according to one embodiment of the present disclosure.

FIG. 1 is a schematic configuration view of a power transmission apparatus 20 according to one embodiment of the present disclosure. The power transmission apparatus 20 shown in the figure is connected to a crankshaft of an engine (not shown) mounted on a front wheel drive vehicle and is able to transmit power from the engine to left and right drive wheels (front wheels) (not shown). As shown in the figure, the power transmission apparatus 20 includes a transmission case 22, a starting device (fluid transmitting device) 23 accommodated inside the transmission case 22, an oil pump 24, an automatic transmission 25, a gear mechanism (gear train) 40, a differential gear (differential mechanism) 50, and the like.

The starting device 23 included in the power transmission apparatus 20 is configured as a torque converter including an input-side pump impeller 23$p$ connected to the crankshaft of the engine, an output-side turbine runner 23$t$ connected to an input shaft (input member) 26 of the automatic transmission 25, a stator 23$s$ disposed inside of the pump impeller 23$p$ and the turbine runner 23$t$ to adjust the flow of hydraulic oil from the turbine runner 23$t$ to the pump impeller 23$p$, a one-way clutch 23$o$ that limits the rotating direction of the stator 23$s$ to one direction, a lockup clutch 23$c$, a damper mechanism 23$d$, and the like. The starting device 23 may be configured as a fluid coupling that does not include the stator 23$s$.

The oil pump 24 is configured as a gear pump including a pump assembly having a pump body and a pump cover, an external gear connected to the pump impeller 23$p$ of the starting device 23 via a hub, an internal gear that meshes with the external gear, and the like. The oil pump 24 is driven by the power from the engine to suction hydraulic oil (ATF) stored in an oil pan (not shown) and feed the pressure of the hydraulic oil to a hydraulic control device (not shown)

that generates an oil pressure required by the starting device 23 and the automatic transmission 25.

The automatic transmission 25 is configured as an eight-speed transmission, and includes, in addition to the input shaft 26, a double pinion type first planetary gear mechanism 30, a Ravigneaux type second planetary gear mechanism 35, four clutches C1, C2, C3 and C4, two brakes B1 and B2, and a one-way clutch F1 for changing a power transmitting path from the input side to the output side, as shown in FIG. 1.

The first planetary gear mechanism 30 of the automatic transmission 25 includes: a sun gear 31, which is an external gear; a ring gear 32, which is an internal gear disposed concentrically to the sun gear 31; and a planetary carrier 34. The planetary carrier 34 holds a plurality of sets of two pinion gears 33a, 33b so that the pinion gears 33a, 33b can spin (rotate) and revolve. In each set, the two pinion gears mesh with each other and one of the pinion gears meshes with the sun gear 31 and the other pinion gear meshes with the ring gear 32. As shown in the figure, the sun gear 31 of the first planetary gear mechanism 30 is fixed to the transmission case 22, and the planetary carrier 34 of the first planetary gear mechanism 30 is coupled to the input shaft 26 so as to rotate together with the input shaft 26. The first planetary gear mechanism 30 is configured as a so-called speed reducing gear, reduces the speed of the power transmitted to the planetary carrier 34, which is an input element, and outputs the power from the ring gear 32, which is an output element.

The second planetary gear mechanism 35 of the automatic transmission 25 includes: a first sun gear 36a and a second sun gear 36b, which are the external gear; a ring gear 37, which is an internal gear, disposed concentrically to the first and second sun gears 36a, 36b; a plurality of short pinion gears 38a meshing with the first sun gear 36a; a plurality of long pinion gears 38b meshing with the second sun gear 36b and the plurality of short pinion gears 38a and meshing with the ring gear 37; and a planetary carrier 39 that hold the plurality of short pinion gears 38a and the plurality of long pinion gears 38b so that the short pinion gears 38a and the long pinion gears 38b can spin (rotate) and revolve. The ring gear 37 of the second planetary gear mechanism 35 functions as an output member of the automatic transmission 25, and the power transmitted from the input shaft 26 to the ring gear 37 is transmitted to right and left drive wheels via the gear mechanism 40, the differential gear 50, and the drive shaft 51. The planetary carrier 39 is supported by the transmission case 22 via the one-way clutch F1, and the rotating direction of the planetary carrier 39 is limited to one direction by the one-way clutch F1.

The clutch C1 is a multi-plate friction type hydraulic clutch (friction engagement element) that includes a hydraulic servo configured by a piston, a plurality of friction plates and separator plates, an oil chamber to which the hydraulic oil is supplied, and the like, and that can connect the ring gear 32 of the first planetary gear mechanism 30 and the first sun gear 36a of the second planetary gear mechanism 35 and release such connection. The clutch C2 is a multi-plate friction type hydraulic clutch that includes a hydraulic servo configured by a piston, a plurality of friction plates and separator plates, an oil chamber to which the hydraulic oil is supplied, and the like, and that can connect the input shaft 26 and the planetary carrier 39 of the second planetary gear mechanism 35 and release such connection. The clutch C3 is a multi-plate friction type hydraulic clutch that includes a hydraulic servo configured by a piston, a plurality of friction plates and separator plates, an oil chamber to which the hydraulic oil is supplied, and the like, and that can connect the ring gear 32 of the first planetary gear mechanism 30 and the second sun gear 36b of the second planetary gear mechanism 35 and release such connection. The clutch C4 is a multi-plate friction type hydraulic clutch that includes a hydraulic servo configured by a piston, a plurality of friction plates and separator plates, an oil chamber to which the hydraulic oil is supplied, and the like, and that can connect the planetary carrier 34 of the first planetary gear mechanism 30 and the second sun gear 36b of the second planetary gear mechanism 35 and release such connection.

The brake B1 is a multi-plate friction type hydraulic brake that includes a hydraulic servo configured by a plurality of friction plates and separator plates, an oil chamber to which the hydraulic oil is supplied, and the like, and that fixes the second sun gear 36b of the second planetary gear mechanism 35 to the transmission case 22 so as not to be rotatable and releases the fixing of the second sun gear 36b to the transmission case 22. The brake B2 is a multi-plate friction type hydraulic brake that includes a hydraulic servo configured by a plurality of friction plates and separator plates, an oil chamber to which the hydraulic oil is supplied, and the like, and that fixes the planetary carrier 39 of the second planetary gear mechanism 35 to the transmission case 22 so as not to be rotatable and releases the fixing of the planetary carrier 39 to the transmission case 22.

The one-way clutch F1 includes an inner race coupled (fixed) to the planetary carrier 39 of the second planetary gear mechanism 35, an outer race, a plurality of sprags, a plurality springs (plate springs), a cage and the like. The one-way clutch F1 transmits torque via each sprag when the outer race is rotated in one direction with respect to the inner race and relatively rotates the inner race and the outer race when the outer race is rotated in the other direction with respect to the inner race. The one-way clutch F1, however, may have a configuration other than the sprag type such as a roller type.

Figure 3:
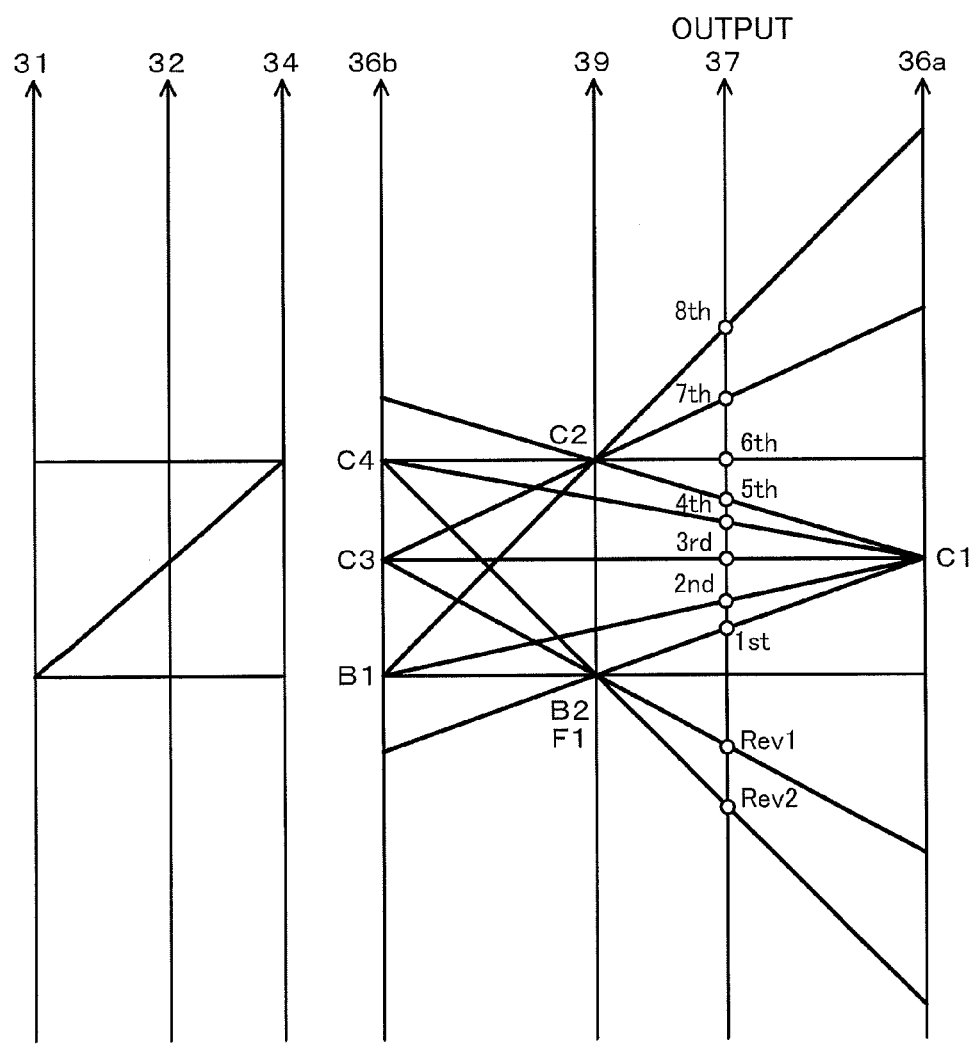
FIG. 3 is a speed line diagram illustrating the relationship of the number of revolutions between rotational elements constituting the automatic transmission included in the power transmission apparatus of FIG. 1.

The clutches C1 to C4 and the brakes B1 and B2 operate when the hydraulic oil is supplied/discharged by the hydraulic control device. FIG. 2 shows an operation table showing the relationship between shift speeds of the automatic transmission 25 and the operation states of the clutches C1 to C4, the brakes B1 and B2, and the one-way clutch F1. FIG. 3 shows a speed line diagram illustrating the relationship of the number of revolutions between rotational elements constituting the automatic transmission 25. The automatic transmission 25 provides first to eighth forward speeds and first and second reverse speeds by causing the clutches C1 to C4 and the brakes B1 and B2 in the states shown in the operation table of FIG. 2. At least one of the clutches C1 to C4 and the brakes B1 and B2 may be a meshing engagement element such as a dog clutch.

The gear mechanism 40 includes: a counter drive gear 41 coupled to the ring gear 37 of the second planetary gear mechanism 35 of the automatic transmission 25; a counter driven gear 43 that is fixed to the countershaft 42 extending in parallel to the input shaft 26 of the automatic transmission 25 and that meshes with the counter drive gear 41; a drive pinion gear (final drive gear) 44 integrally molded with (or fixed to) the countershaft 42 so as to be spaced apart in the axial direction from the counter driven gear 43; and a differential ring gear (final driven gear) 45 meshed with the drive pinion gear 44 and coupled to the differential gear 50.

Figure 4:
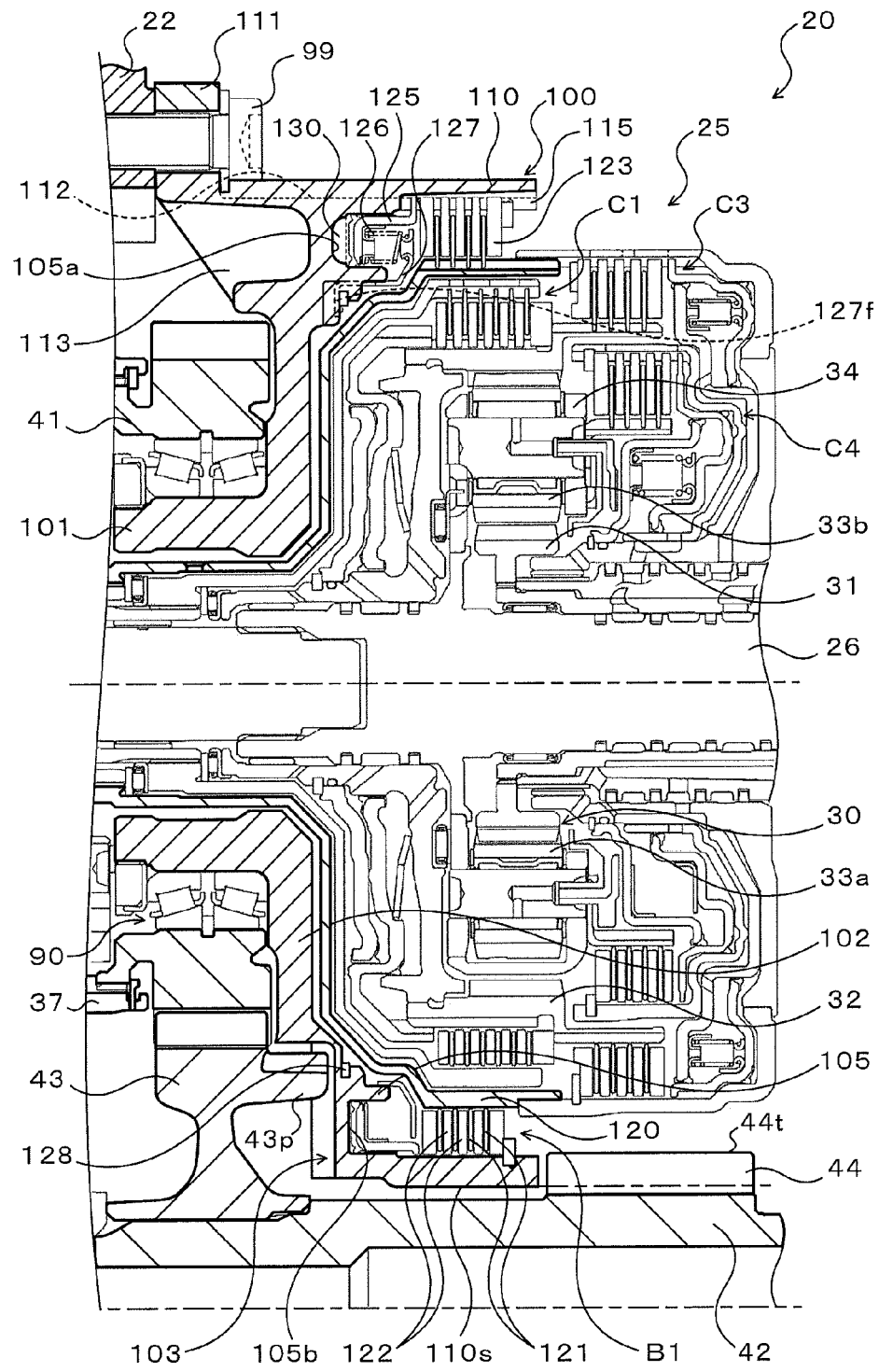
FIG. 4 is an enlarged partial cross-sectional view showing a main part of the power transmission apparatus of FIG. 1.

FIG. 4 is an enlarged partial cross-sectional view showing a main part of the power transmission apparatus 20. FIG. 4 shows a configuration of a portion around the counter drive gear 41 of the gear mechanism 40 and the brake B1 included in the power transmission apparatus 20. As shown in the figure, the counter drive gear 41 of the gear mechanism 40 is coupled to the ring gear 37 of the second planetary gear mechanism 35, and is rotatably supported by a supporting member (center support) 100 fixed to the case via a plurality of bolts 99. The supporting member 100 includes a boss portion 101 that supports the counter drive gear via a bearing 90 such as a tapered roller bearing or a ball bearing, so as to be rotatable, a substantially disc-shaped annular wall portion 102 extended outward from one end of the boss portion 101, and a cylindrical drum portion 110 extended from the annular wall portion 102. The boss portion 101, the annular wall portion 102, and the drum portion 110 are integrally molded, for example, by casting aluminum alloy, and the like.

Figure 5:
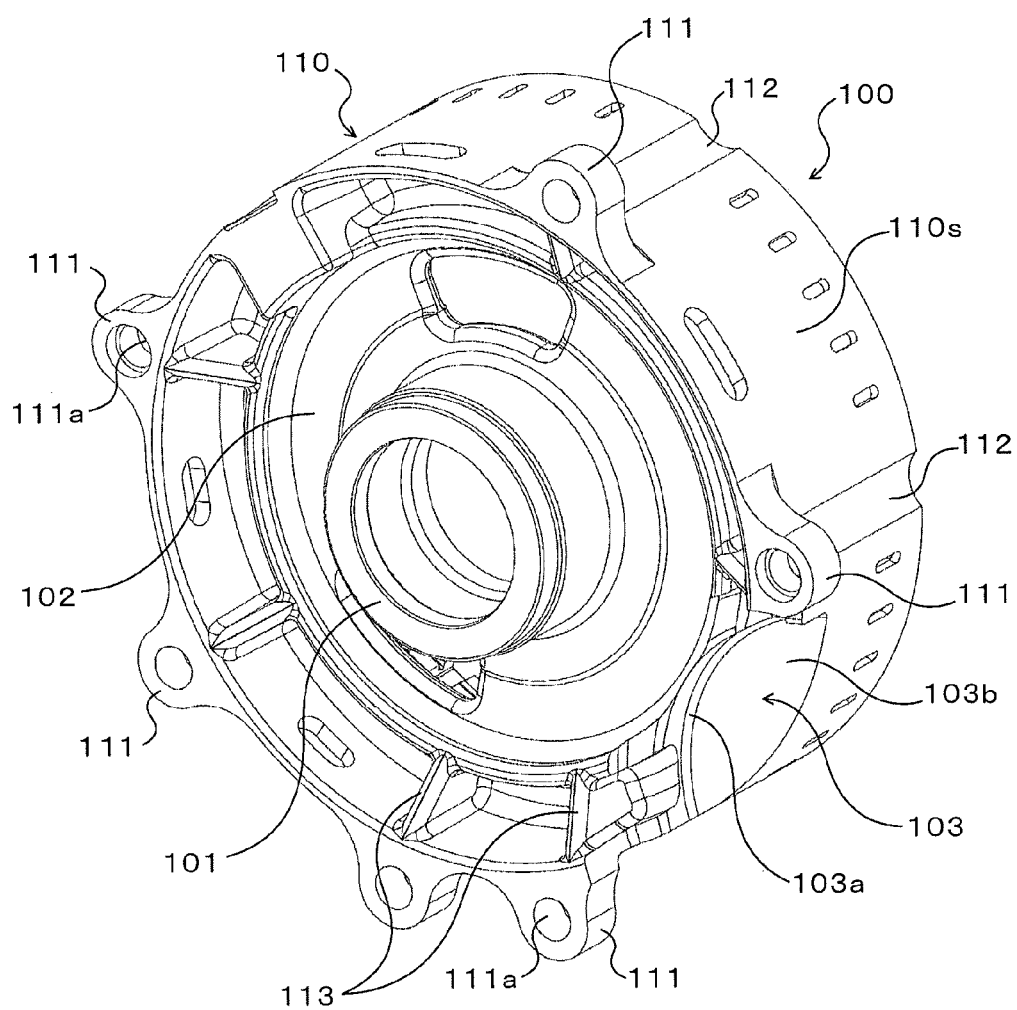
FIG. 5 is a perspective view showing a supporting member included in the power transmission apparatus of FIG. 1.

The boss portion 101 of the supporting member 100 is formed to a cylindrical shape, and the inner race of the bearing 90 is fixed to the outer circumferential surface thereof. The outer race of the bearing 90 is fixed to the inner circumferential surface of the counter drive gear 41 formed into an annular shape, so that the counter drive gear 41 is rotatably supported by the boss portion 101. As shown in FIGS. 4 and 5, the annular wall portion 102 of the supporting member 100 is extended radially outward from an end (the right end in FIG. 4) of the boss portion 101, which is adjacent to the first planetary gear mechanism 30, and is extended between the boss portion 101 and the drum portion 110.

Figure 6:
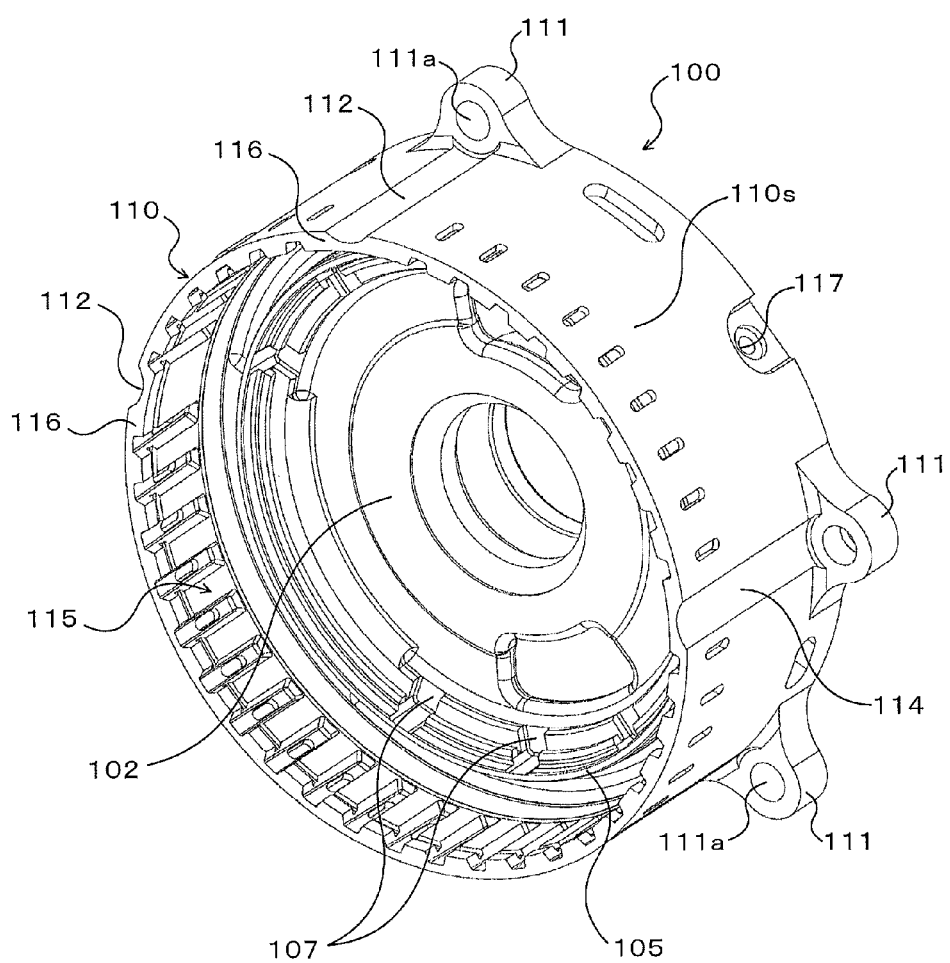
FIG. 6 is a perspective view showing the supporting member included in the power transmission apparatus of FIG. 1.

The drum portion 110 is extended in the axial direction of the input shaft 26 from the outer circumferential portion of the annular wall portion 102 toward the first planetary gear mechanism 30 (the right in FIG. 4) (i.e., first drum portion), and is extended from the outer circumferential portion of the annular wall portion 102 toward the opposite side (toward the second planetary gear mechanism 35: the left in FIG. 4) (i.e., second drum portion) from the first planetary gear mechanism 30 so as to surround the boss portion 101. As shown in FIGS. 5 and 6, the drum portion 110 includes an outer circumferential surface 110s having a circular column surface shape. A plurality of fastening portions 111, each having a bolt hole 111a to which the bolt 99 is inserted, are extended from the outer circumferential surface 110s of the end (the left end in FIG. 4) of the drum portion 110, which is adjacent to the boss portion 101 of the drum portion 110. The plurality of fastening portions 111 are integrally formed with the drum portion 110 so as not to interfere with the counter driven gear 43 that meshes with the counter drive gear 41 supported by the boss portion 101. A recess 112 extending from each fastening portion 111 to an open end (the right end in FIG. 4) of the drum portion 110, which is adjacent to the first planetary gear mechanism 30, is formed on the outer circumferential surface 110s of the drum portion 110.

The drum portion 110 of the supporting member 100 having the above configuration functions as a brake drum of the brake B1 that fixes the second sun gear 36b of the second planetary gear mechanism 35 to the transmission case 22 so as not to be rotatable. Since the cylindrical drum portion 110 is integrally molded with the supporting member 100 that supports the counter drive gear 41, the drum portion 110 also functions as a rib. Thus, it is possible to enhance the strength of the supporting member 100. As a result, when the power is transmitted between the counter drive gear 41 and the counter driven gear 43, deformation of the supporting member 100 can be suppressed even if the load from the counter driven gear 43 acts on the supporting member 100. This allows appropriately meshing the counter drive gear 41 with the counter driven gear 43 and reducing the gear noise.

Furthermore, since the drum portion 110 is integrally molded with the supporting member 100, the number of components can be reduced and the ease of assembly of the automatic transmission 25, and eventually, the power transmission apparatus 20, can be enhanced. In the present embodiment, a plurality of ribs 113 are formed so as to radially extend from the inner circumferential surface of a portion of the drum portion 110, which surrounds the boss portion, to the annular wall portion 102. The strength of the supporting member 100 thus can be further enhanced.

The bolt 99 is inserted to the bolt hole 111a of each fastening portion 111 and screwed to a screw hole formed in the transmission case 22, thereby the supporting member 100 is fixed to the transmission case 22 so that the drum portion 110 is closer to the axis center of the countershaft 42 (counter driven gear 43 and drive pinion gear 44) than to a tooth tip 44t of the drive pinion gear 44 between the counter driven gear 43 and the drive pinion gear 44, as shown in FIG. 4. In other words, the outer circumferential surface 110s of the drum portion 110 is closer to the axis center of the countershaft 42 than to the tooth tip 44t of the drive pinion gear 44 between the counter driven gear 43 and the drive pinion gear 44.

Thus, in the power transmission apparatus 20 including the automatic transmission 25, an increase in the inter-axis distance of the counter drive gear 41 and the counter driven gear 43, that is, the countershaft 42 can be suppressed and the entire apparatus can be reduced in size. Furthermore, in the present embodiment, the recesses 112 formed in the outer circumferential surface 110s of the drum portion 110 can be used as clearance portions (clearance grooves) of a tool, and the like when the supporting member 100 is fastened to the transmission case 22, so that projection of the fastening portion 111 from the outer circumferential surface 110s of the drum portion 110 can be suppressed and the supporting member 100, and eventually, the automatic transmission 25 can be further reduced in size.

Figure 7:
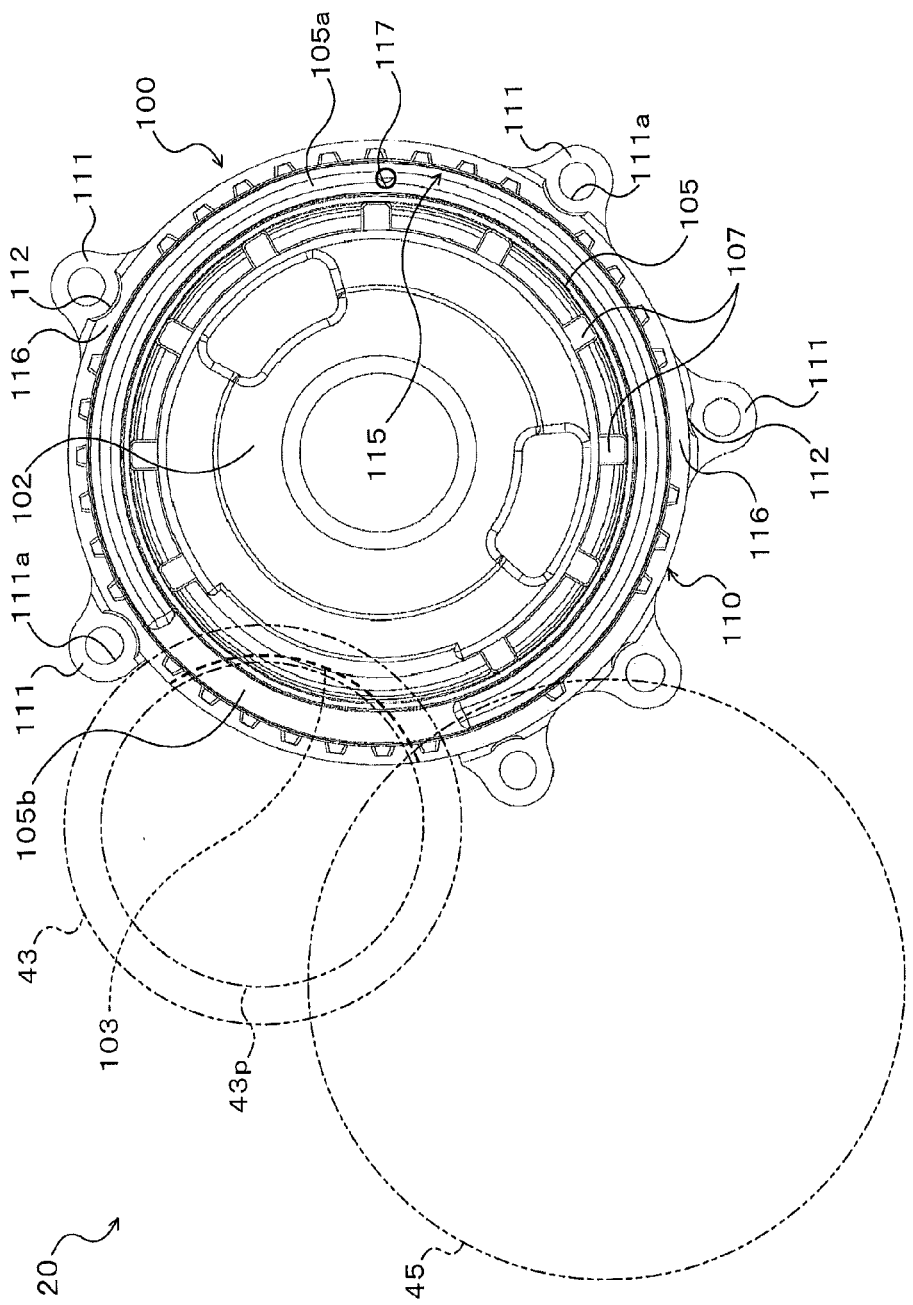
FIG. 7 is an explanatory view showing a configuration of the power transmission apparatus of FIG. 1.

Moreover, as shown in FIGS. 4, 5, and 7, in the annular wall portion 102 of the supporting member, a recessed portion 103 is formed so as to surround a part of the counter driven gear 43 that meshes with the counter drive gear 41. In other words, a parking gear (tooth portion) 43p that can mesh with a parking pole (another member) (not shown) is formed in the counter driven gear 43 so as to axially face the supporting member 100, and the recessed portion 103 includes an inner circumferential surface 103a extending to a substantially arcuate shape that surrounds a part of the parking gear portion 43p of the counter driven gear 43 and a flat side end face 103b that faces a side part of the parking gear portion 43p (see FIG. 5). Forming the recessed portion 103 surrounding the parking gear portion 43p of the counter driven gear 43 in the annular wall portion 102 allows suppressing the interference of the supporting member 100 with the counter driven gear 43 (parking gear portion 43p), and allows disposing the parking gear portion 43p closely to the recessed portion 103. Thus, it is possible to reduce the entire power transmission apparatus 20 in size.

As shown in FIG. 4, the brake B1 that uses the drum portion 110 of the supporting member 100 as a brake drum includes a brake hub 120, a plurality of friction plates (first friction engagement plates) 121 fitted to the brake hub 120 and movably supported by the brake hub 120, and a plurality of separator plates (second friction engagement plates) 122 and a backing plate 123 fitted to a spline 115 formed on the inner circumferential surface of the drum portion 110.

The brake hub 120 is coupled to the second sun gear 36b of the second planetary gear mechanism 35 and the clutch drum commonly shared by the clutches C3 and C4 so as to be integrally rotatable with the second sun gear 36b and the clutch drum. A spline is formed on the outer circumferential surface of the brake hub 120 so that the spline engages with the concave-convex portions formed on the inner circumferential portion of each friction plate 121. The friction plates 121 are each an annular member having a friction material attached to its both surfaces. The separator plates 122 are each an annular member in which its both surfaces are smooth. The separator plates 122 are fitted to the spline 115 of the drum portion 110 such that the separator plates 122 and the friction plates 121 fitted to the brake hub 120 are alternately arranged. The backing plate 123 is fitted to the spline 115 of the drum portion 110 so as to be in contact with the rightmost friction plate 121 (adjacent to the first planetary gear mechanism 30) in FIG. 4, and is axially supported by a snap ring attached to the drum portion 110. In the present embodiment, the spline 115 of the drum portion 110 includes absent portions 116 each formed so as to be located on the back side of the recess 112 of the outer circumferential surface 110s by thinning the spline teeth. Thus, the strength of the drum portion 110, and furthermore, the supporting member 100 can be satisfactorily maintained even if the recesses 112 are formed in the outer circumferential surface 110s.

Furthermore, as shown in FIG. 4, the brake B1 includes a piston 125 that is disposed inside of the drum portion 110 and that presses and engages the friction plates 121 and the separator plates 122 by friction, a plurality of return springs (coil springs) 126 that are disposed inside of the drum portion 110 and that bias the piston 125, and a spring supporting member 127 that is disposed inside of the drum portion 110 and that supports the plurality of return springs 126. The piston 125 is movably supported by the supporting member 100 so as to be located on the annular wall portion 102 side with respect to the friction plates 121 and the separator plates 122. In other words, a cylindrical piston supporting portion 105 is extended in the axial direction of the input shaft 26 from the annular wall portion 102 of the supporting member 100 so as to be located inside of the drum portion 110 at the position relatively adjacent to the drum portion 110. The piston 125 is movably supported by the inner circumferential surface of the drum portion 110 and the outer circumferential surface of the piston supporting portion 105, and a seal member is disposed between the outer circumferential portion of the piston 125 and the inner circumferential surface of the drum portion 110 and between the inner circumferential portion of the piston 125 and the outer circumferential surface of the piston supporting portion 105. Thus, the piston 125, the drum portion 110, and the annular wall portion 102 including the piston supporting portion 105 define an engagement oil chamber 130 to which the hydraulic oil for engaging the brake B1 is supplied.

As apparent from FIG. 4, the engagement oil chamber 130 is defined so as to be located inside of the drum portion 110 and the recessed portion 103 of the annular wall portion 102. Thus, the brake B1, and furthermore, the automatic transmission 25 can be reduced in size by defining the engagement oil chamber 130 of the brake B1 inside of the drum portion 110 integrally molded with the supporting member 100. Furthermore, a cutout (opening) is not formed at the periphery of the recessed portion 103 of the annular wall portion 102 to prevent the leakage of the hydraulic oil to the engagement oil chamber 130 of the brake B1 is defined inside of the recessed portion 103 of the annular wall portion 102, and thus it is possible to suppress lowering in the strength of the supporting member 100 which is associated with forming the above recessed portion 103.

Furthermore, in the present embodiment, the inner surface of the annular wall portion 102 that faces the piston 125 and defines the engagement oil chamber 130 is formed so that the portion located inside of the recessed portion 103 projects further toward the piston 125 than the other portions. In other words, as shown in FIGS. 4 and 7, the inner surface 105b of the annular wall portion 102 located inside of the recessed portion 103 projects further toward the piston 125 than the other inner surface 105a of the annular wall portion 102 defining the engagement oil chamber 130. As shown in FIG. 7, in the supporting member 100, a hydraulic oil supply/discharge hole 117 is formed at a position where the hole and the recessed portion 103 are substantially symmetric across the axis center of the input shaft 26 so as to be spaced apart from the recessed portion 103 in the circumferential direction. The hydraulic oil supply/discharge hole 117 communicates with the engagement oil chamber 130 and allows the supply of hydraulic oil from the hydraulic control device (not shown) to the engagement oil chamber 130 and the discharge of the hydraulic oil from the engagement oil chamber 130. Thus, the portion located inside of the recessed portion 103 of the engagement oil chamber 130 is made shorter (shallower) in the axial direction of the piston 125 to have a smaller capacity than the other portions. This allows enhancing the strength of the annular wall portion 102, and eventually, the supporting member 100, and allows the hydraulic oil to be easily returned from the portion located inside of the recessed portion 103 toward the hydraulic oil supply/discharge hole 117 spaced apart from the recessed portion 103, and thereby the discharging performance of the hydraulic oil can be enhanced.

Figure 8:
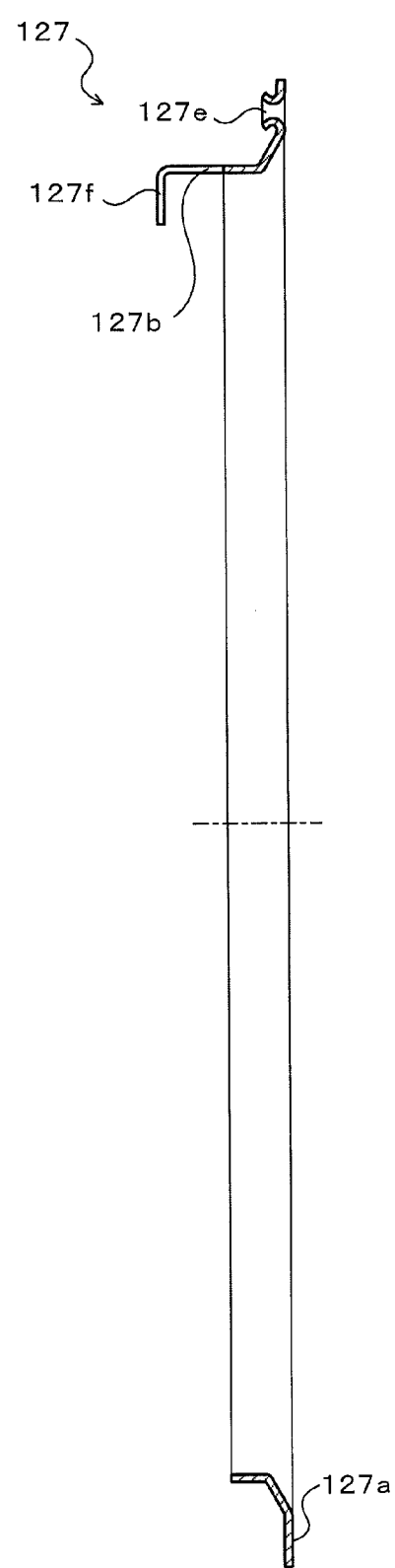
FIG. 8 is a cross-sectional view showing a spring supporting member included in the power transmission apparatus of FIG. 1.

FIG. 8 is a cross-sectional view showing the spring supporting member 127 for supporting the plurality of return springs 126 that bias the piston 125. As shown in the figure, the spring supporting member 127 includes an annular supporting portion 127a having a plurality of engagement portions 127e to be fitted to one end of the respective return springs 126, and a plurality of extended portions 127b extending from the annular supporting portion 127a toward the annular wall portion 102 at intervals in the circumferential direction and each including a substantially rectangular play end 127f that is extended radially inward. As shown in FIGS. 5 to 7, a plurality of contacting recessed portions (contacting portions) 107 that contact with the respective play ends 127f of the spring supporting member 127 are formed in the inner surface of the annular wall portion 102 of the supporting member 100, which faces the brake hub 120. As shown in FIG. 7, in the present embodiment, the plurality of contacting recessed portions 107 are formed at equal intervals in the inner surface of the annular wall portion 102 excluding the inner side of the recessed portion 103. The extended portions 127b are extended from the annular supporting portion 127a of the spring supporting member 127 for the respective contacting recessed portions 107 such that the number of contacting recessed portions 107 of the annular wall portion 102 is identical to the number of the extended portions 127b.

As shown in FIG. 4, the spring supporting member 127 is disposed on the annular wall portion 102 so that the outer surface of each extended portion 127b contacts with the inner circumferential surface of the piston supporting portion 105, and is prevented from falling out from the annular wall portion 102 by the snap ring 128 attached to the annular wall portion 102 such that the snap ring 128 supports the play ends 127f contacting with the respective contacting recessed portions 107. Thus, the spring supporting member 127 can be disposed in a little space in the drum portion 110, whereby the space required to support the plurality of return springs 126 can be reduced and the automatic transmission 25, and eventually, the power transmission apparatus 20 can be further reduced in size. A single plate spring may be used instead of the plurality of coil springs for the return springs 126 of the brake B1.

As described above, in the power transmission apparatus 20, the drum portion 110 that functions as the brake drum of the brake B1 that fixes the second sun gear 36b of the second planetary gear mechanism 35 to the transmission case 22 so as not to be rotatable integrally molded with the supporting member 100 that is fixed to the transmission case 22 via the bolts 99 and that supports the counter drive gear 41 so as to be rotatable.

Since the cylindrical drum portion 110 is thus integrally molded with the supporting member 100 that supports the counter drive gear 41, the drum portion 110 also functions as a rib. Thus, it is possible to enhance the strength of the supporting member 100. As a result, deformation of the supporting member 100 can be suppressed even if the load from the counter driven gear 43 acts on the supporting member 100. This allows appropriately meshing the counter drive gear 41 with the counter driven gear 43 and reducing the gear noise. Furthermore, since the drum portion 110 is integrally molded with the supporting member 100, the number of components can be reduced and the ease if assembly of the automatic transmission 25, and eventually, the power transmission apparatus 20 can be enhanced.

In the power transmission apparatus 20, the annular wall portion 102 of the supporting member 100 is formed to a disc shape without a cutout (opening), and hence it is possible to suppress the lowering in the strength of the supporting member 100. Since the engagement oil chamber 130 of the brake B1 is defined inside of the drum portion 110 that is integrally molded with the supporting member 100, the brake B1, and eventually, the automatic transmission 25 can be reduced in size Furthermore, in the power transmission apparatus 20, the recesses 112 each extending from the fastening portion 111 to the open end of the drum portion 110 is formed on the outer circumferential surface 110s of the drum portion 110, and the spline 115 formed on the inner circumferential surface of the drum portion 110 includes the absent portions 116 each formed so as to be located on the back side of the recess 112. Thus, the recesses 112 formed in the outer circumferential surface of the drum portion 110 can be used as clearance portions of the tool, and the like, when the supporting member 100 is fastened to the transmission case 22, so that projection of the fastening portion 111 from the outer circumferential surface 110s of the drum portion 110 can be suppressed and the supporting member 100, and eventually, the automatic transmission 25, can be further reduced in size. Since the spline 115 on the inner circumferential surface of the drum portion 110 has absent portions 116, the strength of the drum portion 110, and eventually, the supporting member 100 can be satisfactorily maintained even if the recesses 112 are formed in the outer circumferential surface 110s.

Furthermore, the spring supporting member 127 of the power transmission apparatus 20 includes the annular supporting portion 127a that supports one end of each return spring 126 and the plurality of extended portions 127b extending from the annular supporting portion 127a at intervals in the circumferential direction and each including the play end 127f that is extended inward. The spring supporting member 127 is prevented from falling out from the annular wall portion 102 by the snap ring 128 attached to the annular wall portion 102 such that the snap ring 128 supports the play ends 127f contacting with the respective contacting recessed portions 107 of the annular wall portion 102. Thus, the spring supporting member 127 can be disposed in a little space in the drum portion 110, so that the space required to support the return springs 126 can be reduced, and the automatic transmission 25, and eventually, the power transmission apparatus 20 can be further reduced in size.

The lowering in the strength of the supporting member 100 is a concern when the recessed portion 103 is formed in the annular wall portion 102 to suppress the interference with the parking gear portion 43p provided in the counter driven gear 43. However, a cutout (opening) is not formed at the periphery of the recessed portion 103 of the annular wall portion 102 as the engagement oil chamber 130 of the brake B1 is defined inside of the drum portion 110 and the recessed portion 103 of the annular wall portion 102. Thus, it is possible to satisfactorily suppress the lowering in the strength of the supporting member 100 which is associated with forming the recessed portion 103 that suppresses the interference with the parking gear portion 43p.

Moreover, in the power transmission apparatus 20, the portion located inside of the recessed portion 103 of the engagement oil chamber 130 is made shorter (shallower) in the axial direction of the piston 125 to have a smaller the capacity than the other portions. This allows enhancing the strength of the annular wall portion 102, and eventually, the supporting member 100 and allows the hydraulic oil to be easily returned from the portion located inside of the recessed portion 103 toward the hydraulic oil supply/discharge hole 117 spaced apart from the recessed portion 103, and thereby the discharging property of the hydraulic oil can be enhanced.

The embodiment of the present disclosure has been described above, but the present disclosure is not limited to the embodiment described above in any way, and it should be recognized that various changes can be made within the scope of breadth of the disclosure. The "DETAILED DESCRIPTION OF THE EMBODIMENTS" section merely describes a specific mode of the disclosure described in the "SUMMARY" section, and should not limit the elements of the disclosure described in the "SUMMARY" section.

INDUSTRIAL APPLICABILITY

The present disclosure can be used in manufacturing industries of power transmission apparatuses, and the like.

The invention claimed is:
1. A power transmission apparatus including a transmission, a case that accommodates the transmission, a counter drive gear to which power from the transmission is transmitted, and a counter driven gear that meshes with the counter drive gear, the power transmission apparatus comprising:
  a brake that fixes any rotational element of the transmission to the case so as not to be rotatable; and
  a supporting member that is fixed to the case via a fastening member and that supports the counter drive gear so as to be rotatable, wherein:
    the supporting member includes a boss portion that supports the counter drive gear so as to be rotatable, and an annular wall portion that extends outward from an end of the boss portion, the supporting member includes a first drum portion that functions as a brake drum of the brake, the first drum portion extends toward an opposite side of the boss portion from the annular wall portion and the first drum portion has a cylindrical shape that includes a columnar outer peripheral surface, the supporting member includes a second drum portion that extends toward an opposite side of the first drum portion from the annular wall portion so as to surround at least a part of the boss portion and as so as to have a same outer diameter as the columnar outer peripheral surface of the first drum portion, the fastening member does not interfere with the counter driven gear, and the fastening member extends outward in a radial direction from an end of the second drum portion on an opposite side of the annular wall portion, and the boss portion, the annular wall portion, the first drum portion, the second drum portion and the fastening member are integrally formed as a one-piece unitary structure.

2. The power transmission apparatus according to claim 1, wherein the brake includes a brake hub disposed inside of the first drum portion and coupled to the rotational element, a first friction engagement plate fitted to the brake hub, a second friction engagement plate fitted to the first drum portion of the supporting member, and a piston that is disposed inside of the first drum portion and that presses and engages the first and second friction engagement plates by friction; and the annular wall portion extends between the boss portion and the first drum portion.

3. The power transmission apparatus according to claim 2, wherein a recess extending from the fastening member to the other end of the first drum portion is formed in the columnar outer peripheral surface of the first drum portion; and a spline, to which the second friction engagement plate is fitted, is formed on an inner circumferential surface of the first drum portion, the spline including an absent portion formed to be located on a back side of the recess.

4. The power transmission apparatus according to claim 2, wherein the brake further includes a return spring that is disposed inside of the first drum portion and that biases the piston, and a spring supporting member that is disposed inside of the first drum portion and that supports the return spring;

the spring supporting member includes an annular supporting portion that supports one end of the return spring, and a plurality of extended portions extending from the annular supporting portion at intervals in a circumferential direction and each including a play end that is extended inward;

a plurality of contacting portions each contacting with the play end of the spring supporting member are formed on an inner surface of the annular wall portion; and the spring supporting member is prevented from falling out from the annular wall portion by a snap ring attached to the annular wall portion such that the snap ring supports the play end contacting with the corresponding contacting portion.

5. The power transmission apparatus according to claim 1, wherein the counter driven gear includes a tooth portion that is formed to axially face the supporting member and that meshes with another member; and the annular wall portion has a recessed portion formed to surround the tooth portion, and defines an oil chamber, to which hydraulic oil is supplied, inside of the recessed portion in cooperation with the first drum portion and the piston.

6. The power transmission apparatus according to claim 5, wherein an inner surface of the annular wall portion that faces the piston and defines the oil chamber is formed so that a portion located inside of the recessed portion projects further toward the piston than other portions; and the annular wall portion has a hydraulic oil supply/discharge hole communicating with the oil chamber such that the hole is spaced apart from the recessed portion in a circumferential direction.

7. The power transmission apparatus according to claim 1, wherein the annular wall portion extends between the boss portion and the first drum portion; and the first drum portion extends toward the opposite side from the boss portion in the axial direction.

8. The power transmission apparatus according to claim 7, wherein the second drum portion extends toward the opposite side from the brake in the axial direction and the fastening member extends outward adjacent to the boss portion and is fastened to the case via a bolt.

* * * * *